Dec. 17, 1968 H. S. V. JÄRUND 3,416,651

MULTIPLE PACK IN BAND FORM FOR PROTECTIVE SHEATHS FOR THERMOMETERS

Filed Nov. 20, 1967 2 Sheets-Sheet 1

INVENTOR.
HARRY SIGURD VALDEMAR JÄRUND
BY Brumbaugh, Free, Graves & Donohue
his ATTORNEYS.

INVENTOR.
HARRY SIGURD VALDEMAR JÄRUND
BY Brumbaugh, Free, Graves & Donohue
his ATTORNEYS.

United States Patent Office 3,416,651

Patented Dec. 17, 1968

1

3,416,651

MULTIPLE PACK IN BAND FORM FOR PROTECTIVE SHEATHS FOR THERMOMETERS

Harry Sigurd Valdemar Järund, Otto Lindbladsvagen 18, Lund, Sweden

Filed Nov. 20, 1967, Ser. No. 684,322

6 Claims. (Cl. 206—56)

ABSTRACT OF THE DISCLOSURE

A pack of protective sheaths in band form is provided for thermometers having a thermometer cavity of greater length than that of the thermometer itself and an extension, the ends and sides of which are sealed, extending from the upper boundary of the cavity and provided with a slit therein for insertion of a thermometer into the sheath. To widen the slit for facilitating rapid insertion of the thermometer, a pulling tape common to all sheaths is arranged longitudinally between the upper and lower plastic surfaces of the sheaths during their manufacture, the tape being formed of a material which will not become welded to the strips of plastic when they are heat-sealed to form the sheath.

The present invention relates to protective sheaths of supple plastic foil for thermometers such as clinical thermometers and, more particularly, to multiple pack of disposable protective sheaths in band form.

In my U.S. Patent No. 3,253,063, I have disclosed a pack of sheaths for thermometers formed of a transparent thermoplastic material, such pack comprising a continuous backing web to which the sheaths are detachably affixed to lie side by side in an outstretched condition to facilitate the insertion of the thermometer into the sheath.

It has recently been found that for certain purposes sheaths of a special design are preferred. In these specially designed sheaths the length of the thermometer cavity or housing is at least equal to that of the thermometer itself. In addition, each sheath is provided with an extension the sides of which, and, if desired, the ends, are sealed. The extension extends from the upper boundary of the thermometer cavity and is provided with a slit therein which is parallel to one of the side edges of the extension to facilitate the insertion of a thermometer into the sheath.

When using sheaths of this design the slit arranged in the extension must be capable of being widened in a simple manner so that the thermometer can be inserted rapidly into the sheath. To afford the advantages of the multiple pack of protective sheaths according to U.S. 3,253,063, the slit should preferably be widened while the sheath is still affixed to the unfolded paper web.

Accordingly, it is an object of the present invention to provide a sheath arrangement which permits the thermometer to be conveniently and quickly inserted into sheaths having extensions in which the ends and sides are sealed while the sheaths are still attached to the backing web.

According to the present invention, this object is realized by providing a pulling tape which is located in a position transverse to that of the multiple pack of sheaths and which passes through all the end extensions of the sheaths in the pack. The pulling tape is positioned between the bottom portion of each extension which faces the paper web and the upper portion thereof containing the insertion slit and is made of a material having higher heat-sealing temperature than that of the sheath material so that the tape will not become welded to the side edges of the sheaths when they are sealed during the manufacture of the multiple pack.

2

For a better understanding of the present invention reference may be had to accompanying drawings in which.

Figure 1:
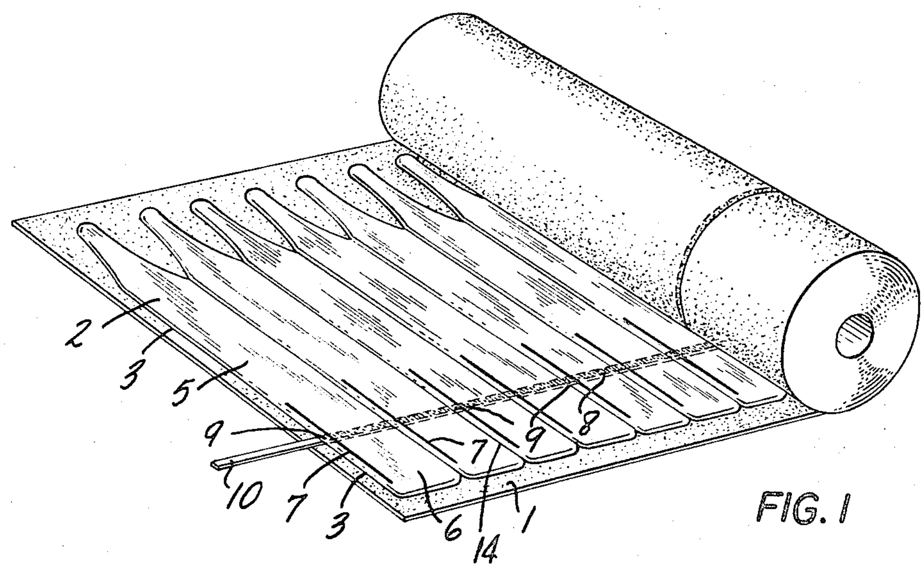
FIG. 1 shows a multiple pack of protective sheaths in band form provided with a pulling tape in accordance with the present invention.

The multiple pack of protective sheaths for thermometers shown in FIG. 1 comprises a continuous backing web 1 of paper or the like on which a plurality of narrow elongated sheaths 2 are individually and detachably secured. The sheaths 2 are formed by a first plastic strip or film 12 detachably secured to the web 1 by means of heat sealing and a second plastic strip or film 13 located on the top of the strip 12 and joined to it along substantially parallel spaced apart edges and at one end by heat seals. The adjacent detachably joined sheaths have a front cavity 5 for receiving a thermometer 4 whose length is greater than that of the thermometer and an extension 6 sealed along its side edges and one end by heat seals which extends from the upper boundary of the thermometer cavity 5.

Figure 2:
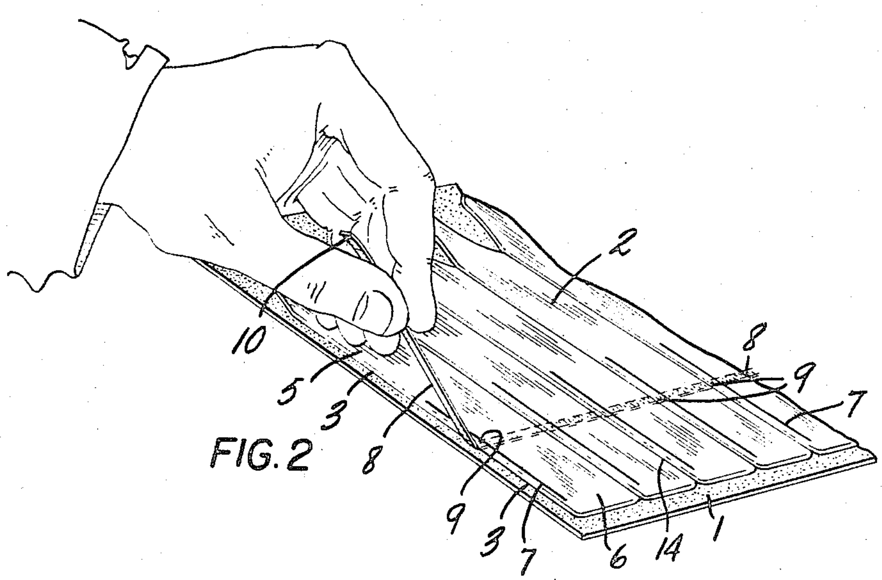
FIG. 2 shows how the pulling tape is manipulated prior to a thermometer being inserted into the sheath.
Figure 3:
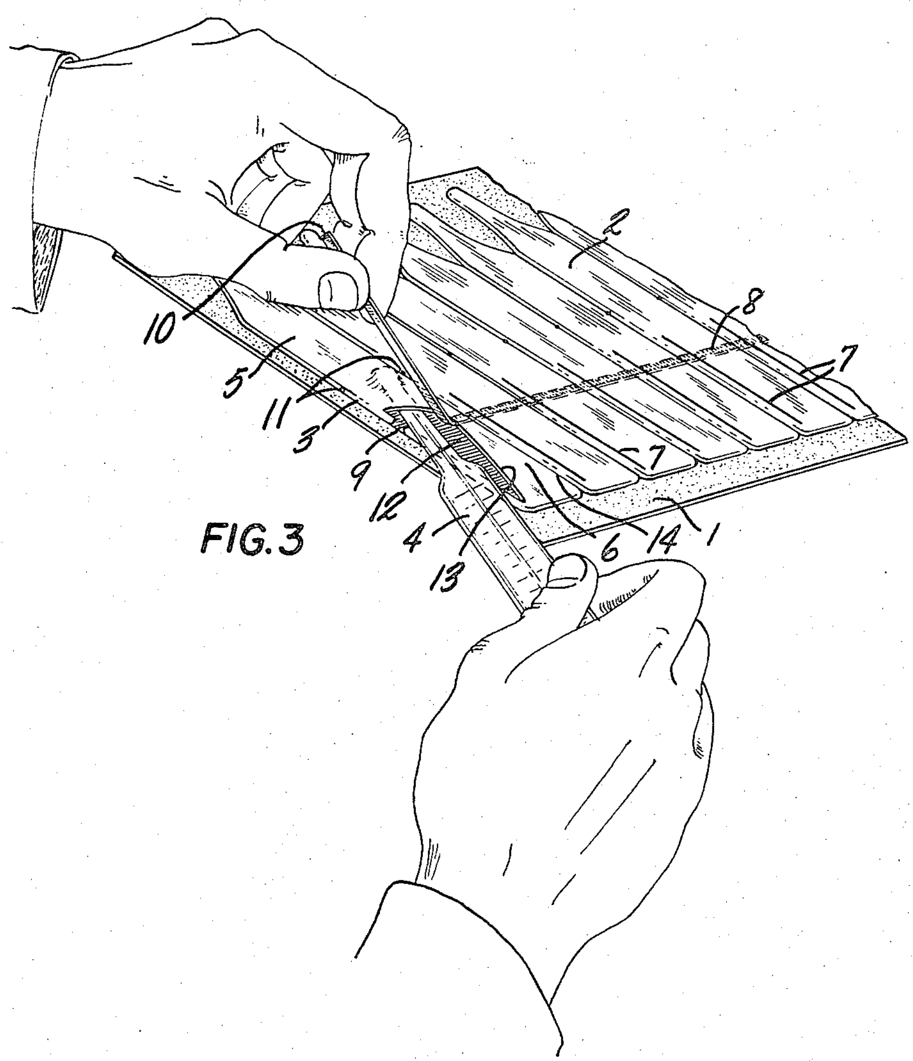
FIG. 3 shows how the pulling tape is manipulated at the moment of insertion.

To facilitate the insertion of the thermometer 4 into the sheath 2, the upper surface of the extension 6 which faces away from the paper web 1 is provided with a slit 7 arranged in the immediate proximity of and parallel with one of the extension's side edges 3. The slit 7 must be capable of being widened to allow a thermometer 4 to be introduced into the sheath with ease. As shown in FIGS. 2 and 3, this widening is achieved by means of an endless pulling tape 8 common to all end extensions 6 of the sheath 2 in the multiple pack and arranged in a longitudinal direction of the paper web 1. The pulling tape 8 is positioned between the two plastic strips 12 and 13 during the manufacture of the sheaths 2 and is formed of a material which will not become welded to the plastic strips 12 and 13 when they are heat-sealed to form the sheath 2. To accomplish this objective, the pulling tape may, for example, be made of a plastic material having higher heat sealing temperature than the material from which the strips 12 and 13 are made so that the tape 8 will not fasten to the paper web 1 nor will it be welded with the sealed side edges of the sheath 2 when the strips 12 and 13 are heat-sealed together.

To insert the thermometer 4 into the sheath 2, the free end 10 of the tape 8 is lifted up in the direction away from the paper web 1. As can be seen from FIG. 2, the portion 9 of strip 13 located between the slit 7 and the side edge 3 of the extension 6 is ripped apart by the upward pull of the tape 8. Upon continued lifting of the tape 8 the slit 7 is widened so that the thermometer can be easily inserted into the thermometer cavity 5 (FIG. 3).

To facilitate further the insertion of the thermometer into the cavity 5 and also to facilitate the separation of the superimposed plastic strips 12 and 13, the opposing surfaces of these strips, at least that portion of these surfaces within the extension 6, can be provided with a friction reducing coating such as chalk or the like.

Figure 4:
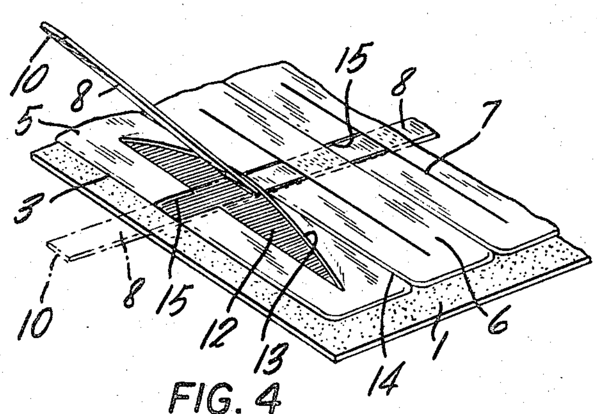
FIG. 4 shows another embodiment of the multiple pack of protective sheaths in accordance with the present invention.

As shown in FIG. 4, if the slit 7 is located at a greater distance from the side edge 3 of the extension 6, a transverse open groove 15 may be provided between the side edge 3 and the slit 7 at the level of the pulling tape 8. In this embodiment, the portion 9 of the strip 13 situated between the slit 7 and the side edge 3 above the tape 8 is not ripped apart by the upward pulling of the tape. As an alternative, a transverse groove having a scored weakenig line could be provided to facilitate the ripping operation.

After inserting the thermometer 4 into the sheath 2 situated nearest to the free end 15 of the pack, the sheath together with the thermometer can be moved from the paper web 1 by raising the thermometer and sheath to break the adhesion between the web 1 and the sheath 2. The thermometer 4 and sheath 2 are then pulled off the tape, whereupon another thermometer can be inserted into the next sheath in the same manner as described above.

When the patient's temperature has been taken and read, the sheath is removed from the inserted thermometer 4 by being progressively stripped off the handle end towards the sensitive ball end of the thermometer without contaminating the thermometer. This stripping operation is accomplished by turning extension 6 inside out whereby the sealed side edges 14 of the extension 6 are torn in such a way that a loop-shaped extension is formed. Thereafter, the side edges of the cavity are torn in a direction towards the lower, tapering end of the sheath 2 so that the handle end of the thermometer is exposed. To prevent the welded side edges of the cavity from being torn to a greater extent than is necessary, a tear barrier 11 in the form of spot welds or the like may be disposed at the side edges of the sheath and at an appropriate distance from the upper boundary of the cavity 5. The exposed handle end is then grasped by the hand and the loop-shaped extension is pulled downwardly to strip off the sheath from the thermometer.

The above-described embodiments of the present invention are merely exemplary, and those skilled in the art will be able to make modifications and variations in them without departing from the spirit and scope of the invention. Therefore, all such modifications and variations are intended to be included within the scope of the invention as defined in the appended claims.

I claim:

1. A multiple pack of protective sheaths in band form for thermometers having a continuous backing web on which a plurality of narrow elongated sheaths are individually and detachably secured, said sheaths having two flexible plastic walls joined together along substantially parallel spaced apart edges and at one end by heat seals to form a cavity a least equal in length to the length of said thermometers, wherein each of said sheaths in said pack is provided with an extension, the ends and sides of which are sealed, extending from the upper boundary of said cavity comprising a bottom strip which faces said web, an upper strip containing a slit therein which is parallel to one of said side edges of said extension, and a pulling tape common to all of said extensions positioned between said bottom strip and said upper strip in the longitudinal direction of said multiple pack and adapted to be lifted in a direction away from said web to widen said slit, said pulling tape being made of a material having a higher sealing temperature than material from which said sheaths are made to prevent said tape from welding to said side edges of said sheath during their manufacture.

2. A multiple pack of protective sheaths for thermometers according to claim 1 wherein said upper and bottom strips of said extension are provided with a friction reducing coating.

3. A multiple pack of protective sheaths for thermometers according to claim 2 wherein said upper and bottom strips of said extension are provided with a friction reducing coating of chalk.

4. A multiple pack of protective sheaths for thermometers according to claim 3 wherein a portion of said upper strip of said extension situated above said tape between said slit and said side edge is ripped when said tape is lifter in a direction away from said web.

5. A multiple pack of protective sheaths for thermometers according to claim 3 wherein said upper portion of said extension is provided with a transverse groove extending between said side edge and said slit.

6. A multiple pack of protective sheaths for thermometers according to claim 5 wherein said groove is located in the immediate proximity of said tape.

No references cited.

JOSEPH R. LECLAIR, *Primary Examiner.*

J. M. CASKIE, *Assistant Examiner.*

U.S. Cl. X.R.

206—16.5; 229—66